(12) United States Patent
Zhou et al.

(10) Patent No.: US 7,581,907 B2
(45) Date of Patent: Sep. 1, 2009

(54) CLAMPING STRUCTURE FOR A HANDLED TOOL

(75) Inventors: Zexin Zhou, Shanghai (CN); Guijie Li, Weihai (CN)

(73) Assignee: Shandong Weida Machinery Co., Ltd., Wendeng City, Shangdong Providence (CN)

( * ) Notice: Subject to any disclaimer, the term of this patent is extended or adjusted under 35 U.S.C. 154(b) by 482 days.

(21) Appl. No.: 11/441,631

(22) Filed: May 26, 2006

(65) Prior Publication Data

US 2006/0273529 A1   Dec. 7, 2006

(30) Foreign Application Priority Data

May 29, 2005   (CN) ........................ 2005 1 0074581

(51) Int. Cl.
   *B23B 31/26* (2006.01)
   *B23B 31/38* (2006.01)
(52) U.S. Cl. .......................... 408/240; 279/62; 279/140; 279/157; 475/349
(58) Field of Classification Search ................. 408/240; 279/60, 61, 62, 140, 157; 475/270, 331, 475/349; *B23B 31/26*
   See application file for complete search history.

(56) References Cited

U.S. PATENT DOCUMENTS

| | | | | |
|---|---|---|---|---|
| 4,641,551 A * | 2/1987 | Pascaloff | .................... | 475/263 |
| 5,820,134 A * | 10/1998 | Subils Valls | .................. | 279/61 |
| 5,882,153 A * | 3/1999 | Mack et al. | .................. | 408/240 |
| 6,729,812 B2 * | 5/2004 | Yaksich et al. | .............. | 408/240 |
| 7,021,400 B2 * | 4/2006 | Oretti | .......................... | 173/29 |
| 7,455,303 B2 * | 11/2008 | Draudt et al. | ................. | 279/63 |
| 2002/0130007 A1 * | 9/2002 | Nakamura et al. | ............ | 192/38 |
| 2006/0061048 A1 * | 3/2006 | Puzio et al. | ................... | 279/60 |
| 2007/0074948 A1 * | 4/2007 | Li | ............................... | 192/46 |
| 2007/0170664 A1 * | 7/2007 | Puzio et al. | ................... | 279/60 |
| 2007/0187908 A1 * | 8/2007 | Puzio | .......................... | 279/60 |
| 2007/0241519 A1 * | 10/2007 | Zhou et al. | .................... | 279/62 |
| 2008/0136124 A1 * | 6/2008 | Tan | .............................. | 279/62 |
| 2008/0185794 A1 * | 8/2008 | Puzio | .......................... | 279/60 |

FOREIGN PATENT DOCUMENTS

| | | |
|---|---|---|
| CN | 2582790 Y | 10/2003 |
| CN | 2585725 Y | 11/2003 |
| DE | 2020449 | 11/1970 |

* cited by examiner

*Primary Examiner*—Eric A Gates
(74) *Attorney, Agent, or Firm*—Hoffmann & Baron, LLP

(57) ABSTRACT

A clamping structure for a handled tool including: (1) a chuck body, provided with gear teeth, ratchet and guiding holes, (2) a plurality of grippers, mounted in the guiding holes of the chuck body and having partial thread on one end; (3) an inner gear ring, (4) a control outer sleeve, having a plurality of control keys and a plurality of driving keys thereon, (5) a driving member having inner taper thread and a plurality of pinions thereon, wherein the inner taper thread engages with the threads of the grippers, and wherein the pinions, mounted to the driving member through pin shafts, engage with both the inner gear ring and the gear teeth of the chuck body, (6) a plurality of resilient anti-loose members with pawl.

34 Claims, 5 Drawing Sheets

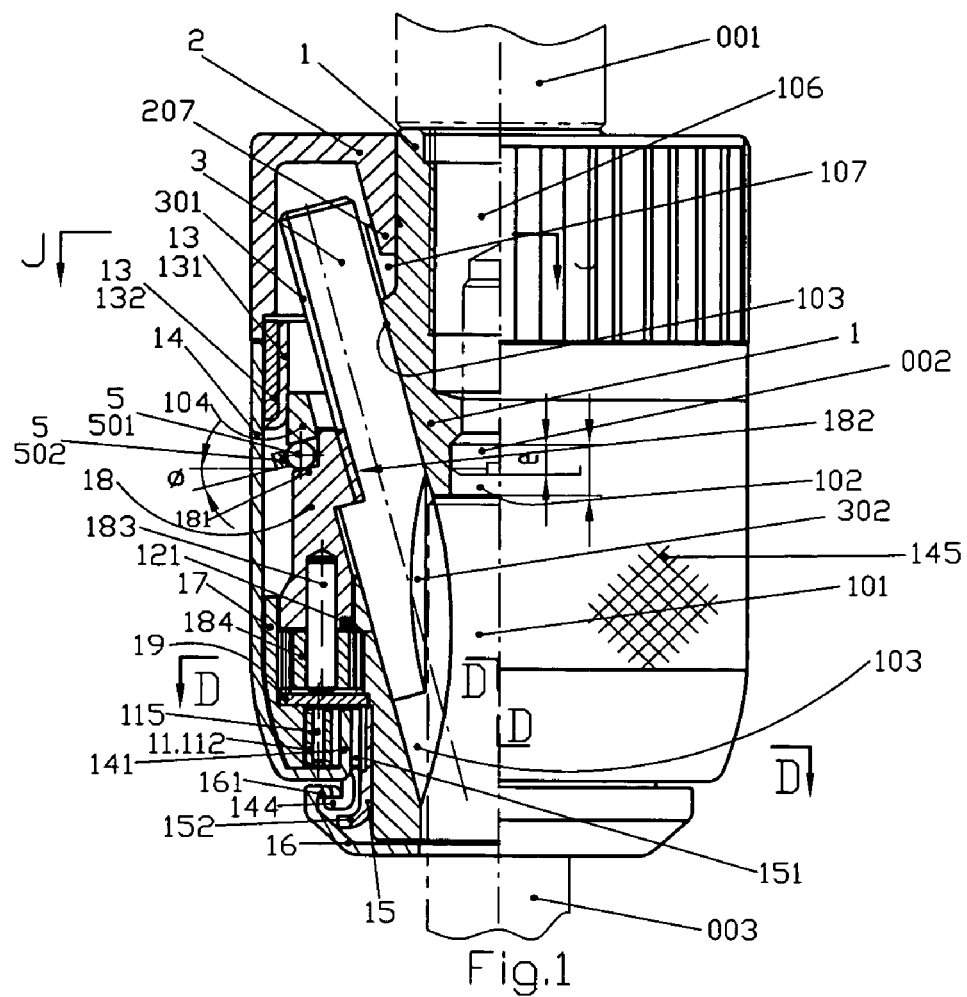
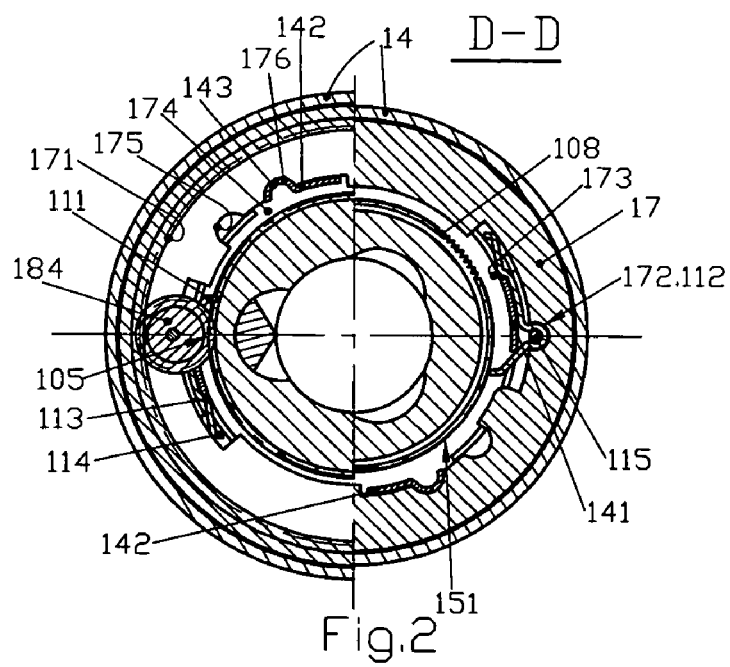

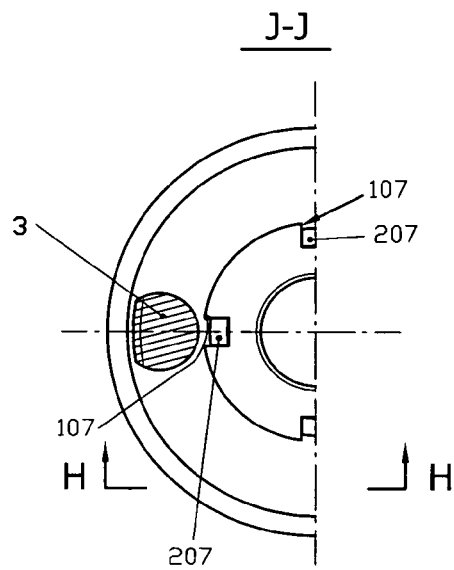
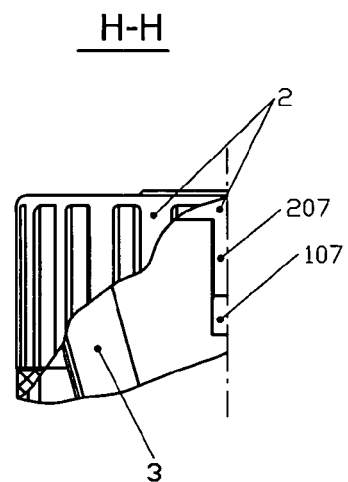
Fig.3    Fig.4
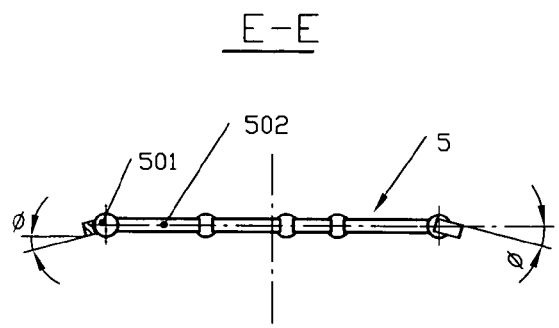
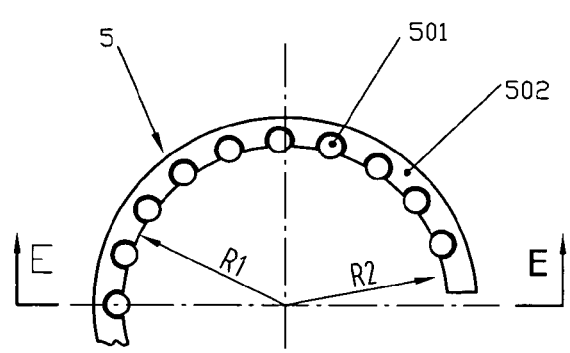
Fig.5    Fig.6

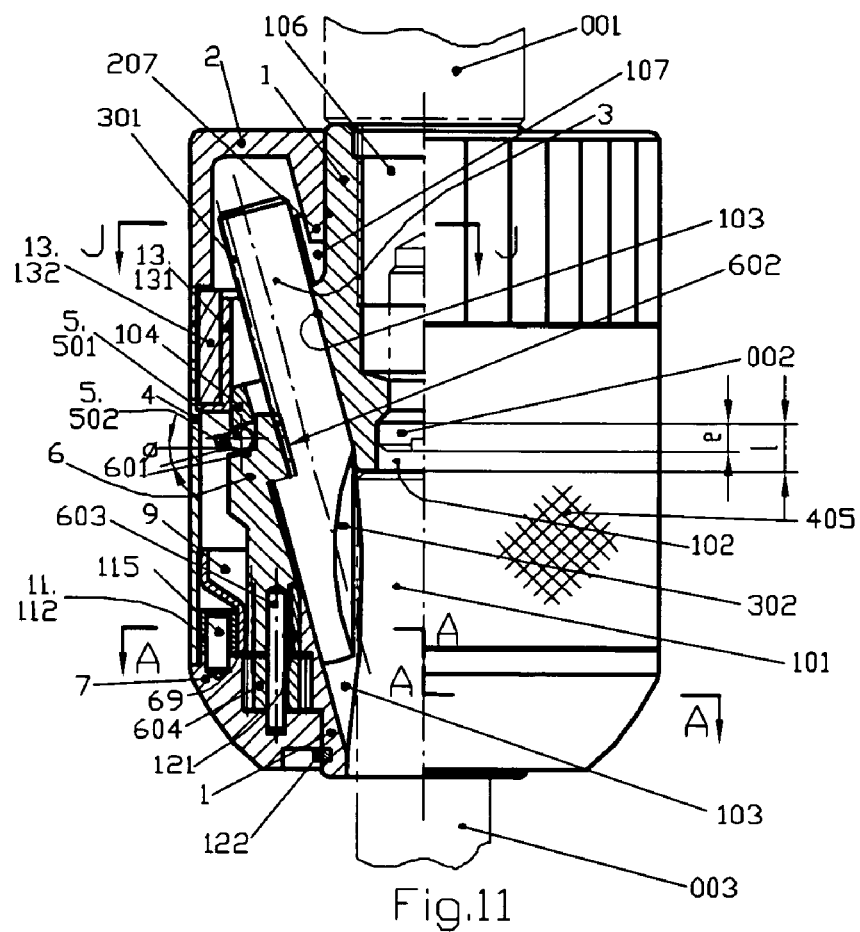
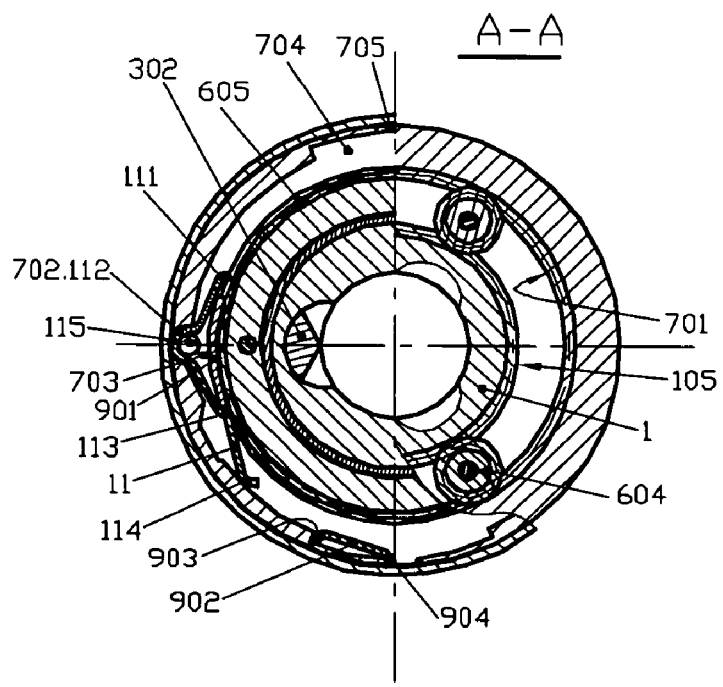
Fig. 11
Fig. 12

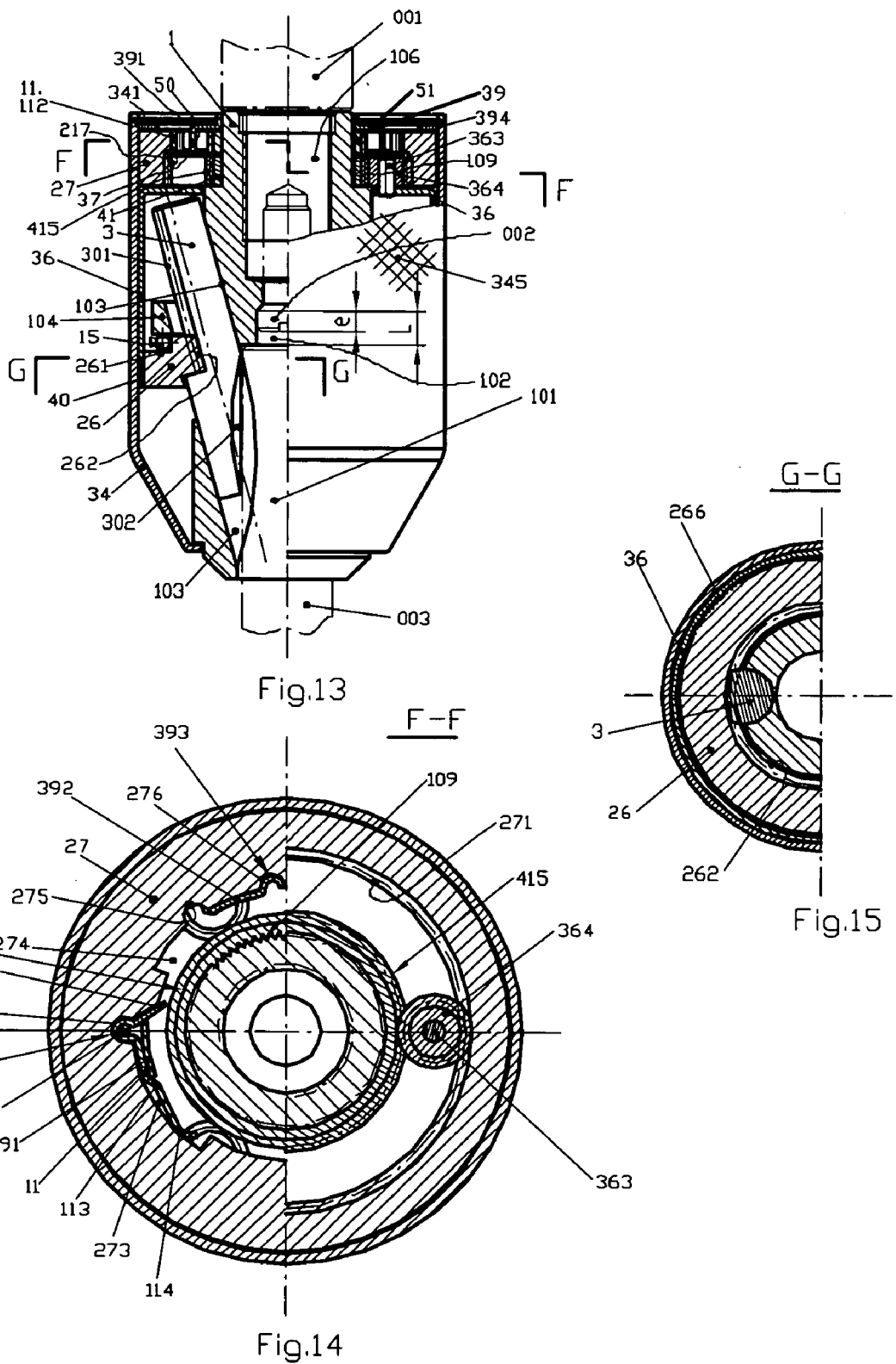

US 7,581,907 B2

CLAMPING STRUCTURE FOR A HANDLED TOOL

This application claims the benefit of the Chinese patent application No. 200510074581.4 filed on May 29, 2005, which is hereby incorporated by reference.

TECHNICAL FIELD

The present invention relates to a clamping structure for a handled tool, more particularly to the clamping structure for a handled tool that may clamp the tool handle at a larger force with a planet mechanism.

BACKGROUND ART

Generally, the existing clamping structure for a handled tool comprises a chuck body, grippers, nuts, bearings, an anti-loose device and an outer sleeve. The chuck body is connected to the driving spindle of the power device. The three grippers are mounted in three equally arranged guiding holes of the chuck body respectively. The grippers, provided with threads, produces screw transmission with the nuts. Rotating the outer sleeve connected to the nut will drive the grippers move along the guiding holes relatively to the chuck body resulting in the tool handle clamped or unclamped. The anti-loose device can prevent the handle from loosening off from the grippers when the tool is loaded and vibrated.

In above structure, because of the very large contact stress produced by the threads between the grippers and the nut under operating load, the relatively sliding friction is large, accordingly the clamping force for clamping the tool handle, produced by the screw transmission between the nut and grippers, is difficult to be large enough, which results in that the grippers are incapable of clamping tightly the tool handle under the operating condition of heavy load and vibration. In addition, for those published anti-loose structures, the anti-loose effects are not good enough because of the structure limitation. For instance, in PCT/CN02/00375, there is a hidden trouble of looseness in the structure under the operating condition of vibration and strike.

SUMMARY OF THE INVENTION

One object of the present invention is: By rotating the control outer sleeve with hand, one can drive an inner gear ring rotating. Larger rotative moment can then be produced by the transmission from a gear ring, through pinions, to a center gear of the chuck body, when resistance exists. That will result in that the tool handle can be clamped with stronger force, when the driving member is rotating relatively to the chuck body, namely, the thread, between the nut and the grippers, makes the relative rotation pushing the grippers to move along the guiding hole of the chuck body.

Another object of the present invention is: during the clamping process of the tool handle mentioned above, the pawl portion of the anti-loose member engages with the ratchet gear when the grippers receive the counterforce of the tool handle. As rotating the outer sleeve with greater force makes grippers clamping the tool handle, the pawl portions make a resilient movement relatively to the ratchet gear and generate the consecutive click prompting the operator a sign of entering the process of clamping with larger force.

Further object of the present invention is: when the grippers are clamping the tool handle under the operating condition of vibration and strike, because the pawl portions of the anti-loose members engage with the ratchet gear, which has the function of preventing the rotation in the opposite direction, the nut is prevented from rotating in the opposite direction relatively to the grippers, by the transmission from the inner gear ring through the pinion to the center gear of the chunk body. Consequently, the tool handle cannot loose off from the grippers under the operating condition of vibration and strike.

The technique solution of the present invention is as follows.

A clamping structure for a handled tool, mounted on a driving spindle driven by a power source, comprising: a chuck body connected at its rear end to the driving spindle, having an accommodating space therein for receiving the tool handle, and having a plurality of guiding holes equally distributed on the surface of a cone coaxial with the chuck body; a plurality of grippers connected with the chuck body and mounted in the guiding holes of the chuck body, with the rear end having partial thread and the front end used for clamping the tool handle ; a driving member mounted around the chuck body and provided with an inner taper thread for mating with the partial thread of the grippers; and a control outer sleeve, characterized in that further comprising: a center gear fixedly mounted to the chuck body; an inner gear ring mounted coaxially with the chuck body, connected with control outer sleeve and having inner gear teeth thereon; and at least one pinion, mounted to the driving member through a pin shaft and engaging with the inner gear ring and the center gear respectively.

In detail, the clamping structure for a handled tool proposed in the present invention is generally mounted to a driving spindle driven by a power source and rotates in both directions driven by the driving spindle. The clamping structure comprises: a chuck body connected at its rear end to the driving spindle and a plurality of grippers connected to the chuck body, characterized in:

(a) an accommodating space for receiving the tool handle formed at the front end of the chuck body, (b) a counter bore with length longer than that of the head of the screw connecting the chuck body to the driving spindle in the accommodating space, (c) a plurality of guiding holes equally distributed on the surface of the cone coaxial with the chuck body, (d) a support stand at an acute angle with the normal surface of the axis of the chuck body, (e) a plurality of connecting grooves at the rear portion of the chuck body, (f) a center gear integrated with the chuck body and a screw hole or a cone hole connected to the driving spindle at the rear end of the chuck body, and (g) The grippers, with partial thread on one end and approximate multi-prism on the other end for clamping the tool handle, are mounted in the guiding holes of the chuck body.

The clamping structure further comprises:

(1) an inner gear ring, mounted coaxially with the chuck body and having inner gear teeth, a plurality of partial pivot holes, a plurality of accommodating spaces for anti-loose member, a plurality of moving spaces for driving key and a positioning recess thereon;

(2) a driving member, which is a rotatable composite structure, having force-transferring end face at an acute angle with the normal surface of its axis, inner taper thread, a plurality of pin shafts whose axes are parallel with those of the thread surface, and a plurality of pinions engaging with the inner gear ring and the center gear of the chuck body respectively and mounted to the pin shaft thereon;

(3) a half-retainer bearing provided between the support stand of the chuck body and the force-transferring end face of the driving member and having a retainer and a plurality of rolling bodies thereon, wherein the retainer is an opening hollow truncated cone of which the generatrix line has a tilt angle with the plane of the rolling body equal to that of the support stand of the chuck body, and the inscribed circle radius of the rolling bodies in the non-operating direction, i.e., in radial direction, is larger than the inner radius of the retainer;

(4) an axial positioning ring for positioning the driving member on the chuck body;

(5) a plurality of resilient anti-loose members with a center pin associated therewith and mounted in the anti-loose member accommodating space of the inner gear ring, capable of swinging about the partial pivot hole, and having a pivot portion, a pawl portion, a projection portion and a support portion thereon, wherein the pivot portion and the center pin are the swinging center of the anti-loose member and the pawl portion engages with the ratchet gear under operating condition for preventing the driving member from counter-rotating relatively to the grippers;

(6) a control outer sleeve, having striae on the external surface convenient of griping, a plurality of control keys, a plurality of connect keys, a plurality of driving keys thereon, wherein a projection portion is on the side of the driving key, the control key controls the pawl portion of the resilient anti-loose member engaging with the ratchet gear by pressing the projection portion of the resilient anti-loose member and the driving key is used for driving the inner gear ring rotating;

(7) a retaining ring provided between the resilient anti-loose member and the pinion of the driving member;

(8) a ratchet gear fixedly mounted to the connect teeth of the chuck body and having ratchets and a stop ring portion thereon, wherein the stop ring portion positions the control outer sleeve on the chuck body axially;

(9) a front cover mounted around the chuck body and the front portion of the outer sleeve and having connecting grooves thereon, wherein the connecting grooves are connected to the connect keys of the control outer sleeve;

(10) a rear cap mounted at the rear portion of the chuck body and having a hole connected to the rear portion of the chuck body and a plurality of connect keys thereon;

(11) a plurality of antifriction units mounted between the chuck body and the control outer sleeve or between the driving member and the control outer sleeve and comprising an article made of low frictional coefficient materials (e.g., PTFE or graphite) and a retainer or comprising rolling bodies and a retainer.

The object of the present invention can be further implemented as follows.

The clamping structure for a handled tool proposed in the present invention is generally mounted on a driving spindle driven by a power source and rotates in both directions driven by the driving spindle. The clamping structure comprises a chuck body connected at its rear end with the driving spindle and a plurality of grippers connected to the chuck body, characterized in:

(a) an accommodating space for receiving the tool handle formed at the front end of the chuck body;

(b) a counter bore with length longer than that of the head of the screw connecting the chuck body to the driving spindle in the accommodating space, (c) a plurality of guiding holes equally distributed on the surface of the cone coaxial with the chuck body, (d) a support stand at an acute angle with the normal surface of the axis of the chuck body, (e) a plurality of connecting grooves at the rear portion of the chuck body, (f) an annular groove at the front portion of the chuck body, (g) a center gear integrated with the chuck body and a screw hole or a cone hole connected to the driving spindle at the rear portion of the clamping structure, and (h) The grippers with partial thread on one end and approximate multi-prism on the other end for clamping the tool handle are mounted in the guiding holes of the chuck body.

The clamping structure further comprises:

(1) an inner gear ring having inner gear teeth, a plurality of partial pivot holes, a plurality of accommodating spaces for anti-loose member, a plurality of moving spaces for driving key and a positioning recess thereon, and mounted coaxially with the chuck body;

(2) a driving member, which is a rotatable composite structure, having force-transferring end face at an acute angle with the normal surface of its axis, inner taper thread, a ratchet gear integrated with the driving member, a plurality of pin shafts whose axis are parallel with those of the thread surface, and a plurality of pinions engaging with the inner gear ring and the center gear of the chuck body respectively and mounted to the pin shafts thereon;

(3) a half-retainer bearing provided between the support stand of the chuck body and the force-transferring end face of the driving member, and having a retainer and a plurality of rolling bodies thereon, wherein the retainer is an opening hollow truncated cone of which the generatrix line has a tilt angle with the surface of the rolling body equal to that of the support stand of the chuck body and the inscribed circle radius of the rolling bodies in the non-operating direction, i.e., in radial direction, is larger than the inner radius of the retainer;

(4) an axial positioning ring for positioning the driving member on the chuck body;

(5) a plurality of resilient anti-loose members with a center pin associated therewith, mounted in the accommodating spaces for anti-loose member of the inner gear ring, capable of swinging about the partial pivot hole, and having a pivot portion, a pawl portion, a projection portion and a support portion thereon, wherein the pivot portion and the center pin are the swinging center of the anti-loose member and the pawl portion engages with the ratchets of the driving member under operating condition for preventing the driving member from counter rotating relatively to the grippers;

(6) a control outer sleeve comprising an outer sleeve and a control ring, wherein the outer sleeve is provided with striae convenient of griping on its surface and the control ring is provided with longitudinal connect serration, a plurality of control keys, a plurality of driving keys thereon, wherein the connect serration is distributed circumferentially and used for fixedly connecting the control ring with the outer sleeve, a projection portion is on a side of the driving key and the control key controls the pawl portion of the resilient anti-loose member engaging to the ratchet gear by pressing the projection portion of the resilient anti-loose member, and the driving key is used for driving the inner gear ring rotating;

(7) a retaining ring mounted between the resilient anti-loose members and the pinions of the driving member;

(8) a clip ring mounted in the annular groove at the front portion of the chuck body and positioning the inner gear ring and the outer sleeve on the chuck body axially;

(9) a rear cap mounted at the rear portion of the chuck body and having a hole connected to the rear portion of the chuck body and a plurality of connect keys thereon; and

(10) a plurality of antifriction units mounted between the chuck body and the control outer sleeve or between the driving member and the control outer sleeve and comprising the articles made of low frictional coefficient materials (e.g., PTFE or graphite) and a retainer or comprising the rolling bodies and a retainer.

The object of the present invention can be further realized as follows.

The clamping structure for a handled tool, proposed in the present invention, is generally mounted on a driving spindle driven by a power source, and rotates in both directions driven by the driving spindle. The clamping structure comprises: a chuck body connected at its rear end with the driving spindle and a plurality of grippers connected to the chuck body, characterized in:

(a) an accommodating space for clamping the tool handle is formed at the front end of the chuck body, (b) a counter bore with length larger than that of the head of the screw connecting the chuck body to the driving spindle in the accommodating space, (c) a plurality of guiding holes equally distributed on the surface of the cone coaxial with the chuck body, (d) a support stand, and (e) longitudinal connect teeth distributed around the external cylindrical surface of the chuck body, and (f) a screw hole or a cone hole connecting to the driving spindle at the rear portion of the clamping structure.

The grippers, with partial thread on one end and the approximate multi-prism on the other end used for clamping the tool handle, are mounted in the guiding holes of the chuck body. The clamping structure is further provided with:

(1) a center gear fixedly mounted on the connect serration of the chuck body, (2) a ratchet gear fixedly mounted on the connect serration of the chuck body as well, (3) an inner gear ring mounted coaxially with the chuck body and having inner gear teeth, a plurality of partial pivot holes, a plurality of accommodating spaces for anti-loose member, a plurality of moving spaces for driving key and positioning recesses thereon, (4) a driving member, which is a rotatable composite structure mounted on the chuck body, comprising a nut, a driving sleeve, a plurality of pin shafts and a plurality of pinions, wherein the nut is provided with taper thread, force-transferring end face and connect serration distributed around the external cylindrical surface, and the driving sleeve is fixedly mounted around the connect serration of the nut, and both the pin shaft and the driving sleeve are fixedly mounted on the circumference of the end face of the driving sleeve wherein the end face centers at the axis and the pin shaft is parallel with the axis of the driving sleeve, and the pinion mounted on the pin shaft engages with the inner gear ring and the center gear of the chuck body respectively, (5) a half-retainer bearing, provided between the support stand of the chuck body and the force-transferring end face of the driving member and having a retainer and a plurality of rolling bodies thereon, wherein the retainer is annular having rolling bodies thereon and the inscribed circle radius of the rolling body is larger than the inner radius of the retainer in the non-operating direction, i.e., in the radial direction, (6) a plurality of resilient anti-loose members with a center pin associated therewith, mounted in the anti-loose member accommodating space of the inner gear ring, capable of swinging about the partial pivot hole and having a pivot portion, a pawl portion, a projection portion and a support portion thereon, wherein the pivot portion and the center pin are the swinging center of the anti-loose member and the pawl portion engages with the ratchet gear connecting to the chuck body under operating condition for preventing the driving member from opposite rotating relatively to the grippers, (7) a control outer sleeve comprising an outer sleeve and a control ring, wherein the outer sleeve, provided with striae on its external surface for conveniently griping, is a sleeve-shaped member, having an annular connecting groove thereon, and the control ring is provided with connect serration, a plurality of control keys and a plurality of driving keys, wherein the connect serration is distributed at the outer circumference and used for fixedly connecting the control ring with the outer sleeve, a projection portion is on the side of the driving key, the control key controls the pawl portion of the resilient anti-loose member engaging to the ratchet gear by pressing the projection portion of the resilient anti-loose member and the driving key is used for driving the inner gear ring rotating, (8) a retaining ring provided between the resilient anti-loose member and the pinion of the driving member, (9) a rear cap mounted in the annular connecting groove of the outer sleeve and having a hole thereon for movably connecting with the rear portion of the chuck body,

(10) a plurality of antifriction units mounted between the chuck body and the outer sleeve or between the driving member and the control outer sleeve and comprising an article made from low frictional coefficient materials (e.g., PTFE or graphite) and a retainer or comprising the rolling bodies and a retainer.

(11) The connect teeth of the chuck body can be connect serration.

Using the technique solutions mentioned above, this invention presents the following innovative effects:

While rotating the control outer sleeve, the driving key driven by the outer sleeve makes the inner gear ring rotating. Then through the transmission from the gear ring, via the pinions of the driving member, to the center gear of the chuck body (or fixedly connected to the chuck body), the larger rotative moment is produced when resistance exists, which drives the driving member rotating relatively to the chuck body, i.e., drives the thread of the driving member (or nut) rotating relatively to the thread of the grippers. Sequentially the grippers are driven to clamp the tool handle with a larger force along the guiding hole of the chuck body.

During the clamping process of the tool handle mentioned above, while the grippers receive the counterforce of the tool handle, the projection portion of the driving key on the control ring engages with the positioning recess of the inner gear ring, generating a click which prompts the operator a sign of starting clamping, simultaneously the pawl portion of the anti-loose member engages with the ratchet gear as well under the control of the control key.

As continuing rotating the control outer sleeve resulting in that the grippers clamp the tool handle with larger force, the pawl portions of the anti-loose members make resilient movement relative to the ratchet gear generating the consecutive click which prompts the operator a sign of being in the process of clamping with larger force.

While the grippers clamp the tool handle under the operating condition of vibration and strike, because the engagement between the pawl portion of the anti-loose member and the ratchet gear has the function of stopping the opposite rotation, the opposite rotation of the driving member (or nut) relative to the grippers is prevented by the transmission from the inner gear ring, via the pinion, to the center gear of the chuck body (or fixedly connected to the chuck body). Consequentially, the tool handle cannot be loosened off from the grippers under the operating condition of vibration and strike.

When unclamping the tool handle, the control outer sleeve should be rotated in the opposite direction. The projection portion of the driving key engages with the other opposite positioning recess of the inner gear ring, generating a click which prompts the operator a sign of starting unclamping.

BRIEF DESCRIPTION OF THE DRAWINGS

The above and other objectives and features of the present invention will become apparent from the following description of preferred embodiments, given in conjunction with the accompanying drawings, in which:

FIG. 1 is a front sectional view of the clamping structure according to a first embodiment of the present invention;

FIG. 2 is a sectional view taken along line D-D in FIG. 1, wherein the member 19 is removed;

FIG. 3 is a sectional view taken along line J-J in FIGS. 1 and 11;

FIG. 4 is a sectional view taken along line H-H in FIG. 3;

FIG. 5 is a front sectional view of a half-retainer bearing in the claming structure according to the first embodiment and a second embodiment of the invention;

FIG. 6 is a top view of FIG. 5;

FIG. 11 is a front sectional view of the clamping structure according to the second embodiment of the invention;

FIG. 12 is a sectional view taken along line A-A in FIG. 11;

FIG. 13 is a front sectional view of the clamping structure according to the third embodiment of the invention;

FIG. 14 is a sectional view taken along line F-F in FIG. 13, wherein the member 37 being removed;

FIG. 15 is a sectional view taken along line G-G in FIG. 13.

DESCRIPTION OF PREFERRED EMBODIMENTS

Figure 7:
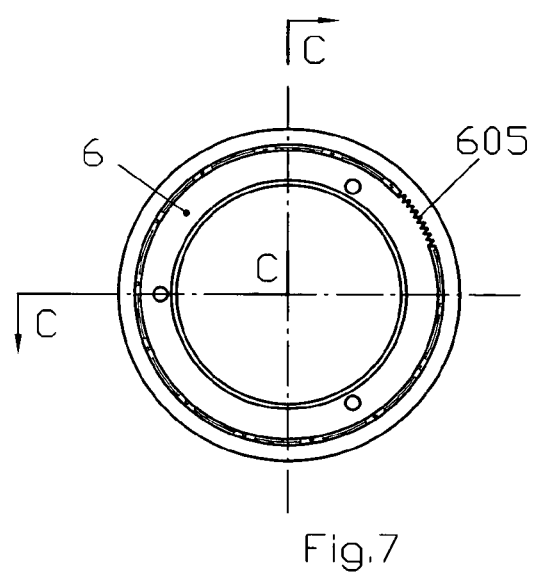
FIG. 7 is a view of FIG. 8 in direction D.

The clamping structure of the present invention can be used for clamping the tools with a handle with the primary function of producing rotating movement, for example drill, screw tap and so forth. For convenience, they are all called as the tool handle in this specification. The following is further description of the present invention associating with the figures.

Referring to FIG. 1 to FIG. 6, the clamping structure according to the first embodiment of the present invention comprises:

a chuck body 1 including a screw hole or a cone hole 106 connected to the driving spindle 001 of the power source at its rear portion, a plurality of connecting grooves 107, an accommodating space 101 in which the tool handle is clamped in its front end, a counter bore 102 in the accommodating space 101 with the length (L) larger than the length (e) of the head 002 of the screw connecting the chuck body to the driving spindle, a plurality of guiding holes 103 equally distributed on the surface of the cone coaxial with the chuck body, a support stand 104, a center gear 105 integrally formed with the chuck body and the connect serration 108;

a plurality of grippers 3 mounted in the guiding hole 103 of the chuck body 1 wherein the partial thread 301 is on one end and approximate multi-prism (multi-edges portion) 302 is on the other end, and used for clamping the tool handle;

an inner gear ring 17 mounted coaxially with the chuck body I and having inner gear teeth 171, partial pivot hole 172, accommodating space 173 for anti-loose member, moving space 174 for driving key and positioning recesses 175 and 176;

a driving member 18, which is a rotatable composite structure, provided with the force-transferring end face 181 at an acute angle with the normal surface of its axis, inner taper thread 182, a plurality of pin shafts 183 wherein the axis of the pin shaft is parallel with the axis of the thread face, a plurality of pinions 184 mounted to the pin shaft and engaging with the gear teeth 171 of the inner gear ring and the center gear 105 of the chuck body respectively;

a ratchet gear 15 fixedly mounted to the connect serration 108 of the chuck body and having ratchets 151 and stop ring portion 152 thereon;

a plurality of resilient anti-loose members 11 mounted in the accommodating space 173 for anti-loose member of the inner gear ring and capable of swinging about the partial pivot hole 172, whereon are provided a pivot portion 112, a center pin 115, a pawl portion 111, a projection portion 113 and a support portion 114;

a half-retainer bearing 5 positioned between the support stand 104 of the chuck body and the force-transferring end face 181 of the driving member and having retainer 502 and a plurality of rolling bodies 501 thereon, wherein the retainer 502 is an opening hollow truncated cone of which the generatrix line has a tilt angle $\phi$ with the plane of the rolling bodies 501 equal to that of the support stand 104 of the chuck body, and the inscribed circle radius R2 of the rolling bodies 501 in non-operating direction, i.e., in radial direction, is larger than the inner radius R1 of the retainer;

an axial positioning ring 121 positioning the driving member 18 on the chuck body 1;

a control outer sleeve 14 having striae 145 convenient of gripping on the external surface, a plurality of control keys 141, a plurality of connect keys 144, a plurality of driving keys 142 having projection portion 143 on its side;

a retaining ring 19 mounted between the resilient anti-loose member 11 and the pinion 184 of the driving member;

a front cover 16 mounted around the front portion of the chuck body 1 and the control outer sleeve 14, having connecting groove 161 thereon and connecting to the connect key 144 of the control outer sleeve;

an antifriction unit 13 comprising the articles 132 made of low frictional coefficient materials (e.g., PTFE or graphite) and a retainer 131 and mounted between the chuck body 1 and the control outer sleeve 14;

a rear cap 2 mounted to the rear portion of the chuck body, and provided with a hole connecting to the rear portion of the chuck body and a plurality of connect keys 207.

Figure 9:
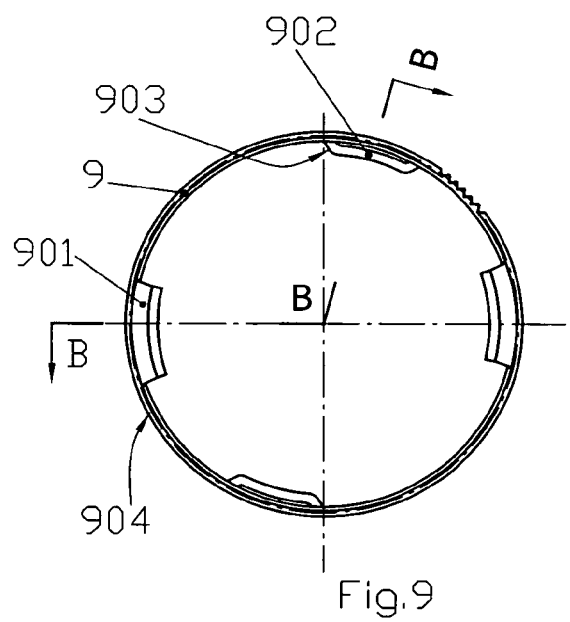
FIG. 9 is a diagram view of the control ring (9) of the control outer sleeve (14) in the clamping structure according to the second embodiment of the present invention.
Figure 8:
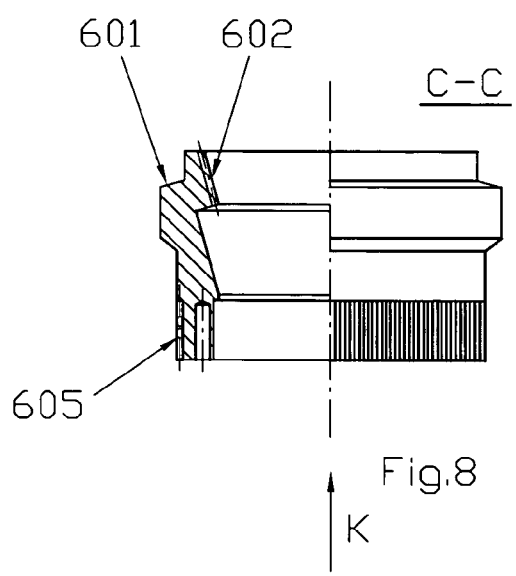
FIG. 8 is a front sectional view of the clamping structure according to the second embodiment of the invention with the pin shafts (183, 363) and the pinion (184) being removed (a sectional view taken along line C-C in FIG. 7)
Figure 10:
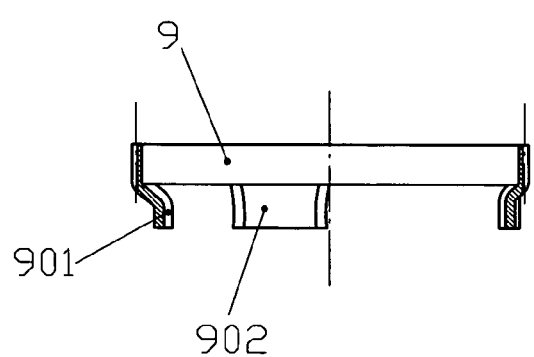
FIG. 10 is a sectional view taken alone line B-B in FIG. 9.

Referring to FIG. 7 to FIG. 12, the second embodiment of the present invention comprises:

a chuck body 1 including a screw hole or a cone hole 106 connected to the driving spindle 001 of the power source at its rear portion, a plurality of connecting grooves 107, an accommodating space 101 for clamping the tool handle in its front end, a counter bore 102 in the accommodating space 101 with the length (L) larger than the length (e) of the head 002 of the screw connecting the chuck body to the driving spindle, a plurality of guiding holes 103 equally distributed on the surface of the cone coaxial with the chuck body, a support stand 104, center gear teeth 105 integrally formed with the chuck body;

a plurality of grippers 3 mounted in the guiding hole 103 of the chuck body 1 wherein the partial thread 301 is on one end and approximate multi-prism 302 is on the other end, and used for clamping the tool handle;

an inner gear ring 7 mounted coaxially with the chuck body 1 and having inner gear teeth 701, partial pivot hole 702, accommodating space 703 for anti-loose member, moving space 704 for driving key and positioning recess 705 thereon;

a driving member 6, which is a rotatable composite structure, provided with the force-transferring end face 601 at an acute angle with the normal surface of the axis of the driving member, inner taper thread 602, a plurality of pin shafts 603 wherein the axis of the pin shaft is parallel with the axis of the thread face, a plurality of pinions 604 mounted to the pin shafts and engaging with the gear teeth 701 of the inner gear ring and the gear teeth 105 of the chuck body respectively, and the ratchet 605 provided on the external surface of the driving member;

a plurality of resilient anti-loose members 11 mounted in the accommodating space 703 for anti-loose member of the inner gear ring and capable of swinging about the partial pivot hole 702, whereon are provided pivot portion 112, center pin 115, pawl portion 111, projection portion 113 and support portion 114;

a half-retainer bearing 5 positioned between the support stand 104 of the chuck body and the force-transferring end face 601 of the driving member, having retainer 502 and a plurality of rolling bodies 501 thereon, wherein the retainer 502 is an opening hollow truncated cone of which the generatrix line has a tilt angle φ with the surface of the rolling bodies 501 equal to that of the support stand of the chuck body, and the inscribed circle radius R2 of the rolling bodies 501 in non-operating direction, i.e., in radial direction, is larger than the inner radius R1 of the retainer (referring to FIG. 6);

an axial positioning ring 121 positioning the driving member 6 on the chuck body 1;

a control outer sleeve comprising an outer sleeve 4 and a control ring 9, wherein the outer sleeve has striae 405 on the surface convenient of griping and the control ring is provided with the longitudinal connect serration 904 circumferentially distributed and used for fixedly connecting to the outer sleeve 4, a plurality of control keys 901, a plurality of driving keys 902 having projection portions 903 and 904 on its side, wherein the control key controls the pawl portion of the resilient anti-loose member engaging with the ratchet gear by pressing the projection portion of the resilient anti-loose member, and the driving key drives the inner gear ring rotating.

a retaining ring 69 mounted between the resilient anti-loose member 11 and the pinion 604 of the driving member;

an antifriction unit 13 comprising the article 132 made of low frictional coefficient materials (e.g., PTFE or graphite) and a retainer 131 and mounted between the chuck body 1 and the outer sleeve 4; and a clip ring 122, mounted in the front portion of the chuck body.

Referring to FIG. 13 to FIG. 15, a clamping structure according to the third embodiment of the present invention comprises:

A chuck body 1 including a screw hole or a cone hole 106 connected to the driving spindle 001 of the power source at its rear portion, a plurality of connecting grooves 107, an accommodating space 101 wherein the tool handle is clamped in the front end, a counter bore 102 in the accommodating space 101 with the length (L) larger than the length (e) of the head 002 of the screw connecting the chuck body to the driving spindle, a plurality of guiding holes 103 equally distributed on the surface of the cone coaxial with the chuck body, a support stand 104, and connect serration 109 arranged annularly around the external cylindrical surface of the chuck body;

a plurality of grippers 3 mounted in the guiding holes 103 of the chuck body 1 wherein the partial thread 301 is on one end and approximate multi-prism 302 is on the other end, and used for clamping the tool handle;

a center gear 41 fixedly mounted to the connect serration 109 of the chuck body and having the gear teeth 415 thereon.

an inner gear ring 27 mounted coaxially with the chuck body 1 and having inner gear teeth 271, partial pivot hole 272, accommodating space 273 for anti-loose member, moving space 274 for driving key and positioning recesses 275 and 276 thereon;

a driving member, which is a rotatable composite structure mounted on the chuck body, comprising a nut 26, a driving sleeve 36, a plurality of pin shafts 363 and a plurality of pinions 364, wherein the nut is provided with taper thread 262, force-transferring end face 261 and connect serration 266 distributed around the external cylindrical surface, and the driving sleeve 36 is fixedly mounted around the connect serration 266 of the nut and both the pin shaft 363 and the driving sleeve are fixedly mounted on the circumference of the end face of the driving sleeve wherein the end face centers at the axis of the driving sleeve and the pin shaft is parallel with the axis of the driving sleeve, and the pinion 364 mounted to the pin shaft engages with the gear teeth 271 of the inner gear ring and the gear teeth 415 of the center gear of the chuck body respectively;

a plurality of resilient anti-loose members 11 mounted in the accommodating space 703 for anti-loose member of the inner gear ring and capable of swinging about the partial pivot hole 702, whereon are provided pivot portion 112, center pin 115, pawl portion 111, projection portion 113 and support portion 114;

a half-retainer bearing 15, positioned between the support stand 104 of the chuck body and the force-transferring end face 261 of the driving member, having retainer and a plurality of rolling bodies thereon, wherein the retainer is annular having the rolling bodies thereon and the inscribed circle radius of the rolling bodies in non-operating direction, i.e., in radial direction, is larger than the inner radius of the retainer;

a ratchet gear 51 fixedly mounted to the connect serration 109 of the chuck body and having ratchet 515 thereon;

a control outer sleeve comprising an outer sleeve 34 and a control ring 39, wherein the outer sleeve has striae 345 on the surface convenient of griping and the control ring is provided with the longitudinal connect serration 394, a plurality of control keys 391 and a plurality of driving keys 392, wherein the connect serration 394 is circumferentially distributed and used for fixedly connecting to the outer sleeve 34, the driving key 392 has a projection portion 393 on the side, the control key controls the pawl portion 111 engaging with the ratchet gear 51 by pressing the projection portion 113 of the resilient anti-loose member and the driving key 392 drives the inner gear ring 27 rotating;

a retaining ring 37 mounted between the resilient anti-loose member 11 and the pinion 364 of the driving member; and an antifriction member 40 made from low frictional coefficient materials (e.g., PTFE or graphite) and mounted between the chuck body 1 and the outer sleeve 34.

Now the operation of the clamping structure, according to the present invention, will be described with reference to the first embodiment.

A tool handle 003 is inserted in the tool handle accommodating space 101 of the chuck body 1, and then the control outer sleeve 14 is rotated relatively to the rear cap 2 mounted at the chuck body in the clamping direction. Driving keys 142 of the control outer sleeve 14 engage at their projection 143 with the positioning recess 176 of the inner gear ring 17 so that the inner gear ring 17 of the planet mechanism can be rotated relative to the chuck body 1. In the planet mechanism, the pinions 184 engage simultaneously with the inner gear ring 17 and the ratchets 105 on the chuck body 1, and rotate about chuck body 1, therefore, the driving member 18 that the pinion 184 connected thereto may rotate relative to the chuck body 1, so that the thread 182 of the driving member 18 is caused to rotate relative to the thread 301 of the grippers 3 mounted to the chuck body 1 so that the grippers 3 approach and clamp the tool handle 003. With continually increasing the moment that rotates the control outer sleeve 14 relative to the rear cap 2 mounted on the chuck body 1, the driving keys 142 move in the clamping direction leading their projection portions 143 engage with another positioning recesses 175, which generates a click. At the same time the driving key 142 are in contact with the end wall of moving space 174 for driving key in the clamping direction, and the control keys 141 move and press the projection portion 113 of the resilient anti-loose member 11 such that the pawl portion 111 of the resilient anti-loose member 11 engage with the ratchets 151 of the ratchet gear 15. Continually increasing the moment applied to cause the control outer sleeve 14 to rotate relative to the rear cap 2 mounted at the chuck body 1, the driving keys 142 urge the inner gear ring 17 to move slightly, and the pawl 111 of the resilient anti-loose member 11 jumps along the ratchets 151 and generates consecutive click to prompt that the tool handle is now being clamped by the driving keys. Since the planet mechanism could have a very large gear ratio, the clamping structure may provide a larger clamping moment such that the jaws 3 may clamp the tool handle at a larger force.

As it requires releasing the tool handle, the control outer sleeve 14 is rotated relative to the rear cap 2 in the contrary direction, and the control key 141 rotates in opposite direction to disengage from the projection portion 113 of the resilient anti-loose member 11. Based on the action of the resilient force, the pawl portion 111 of the resilient anti-loose member 11 disengages from the ratchets 151, at the same time, the projection 143 of the driving key 14 moves to engage with the other positioning recess 176 in opposite direction of the inner gear ring 17, and generates the click prompting the operator a sign of beginning to loose.

While the present invention has been described and illustrated herein with reference to the preferred embodiments thereof, it will be apparent to those skilled in the art that various changes and modifications may be made therein without departing from the spirit and scope of the invention. Thus, it is intended that the present invention cover the modifications and variations of this invention that come within the scope of the appended claims and their equivalents.

The invention claimed is:

1. A clamping structure for a handled tool, mounted to a driving spindle driven by a power source and comprising: a chuck body connected at its rear end with the driving spindle, having an accommodating space therein for clamping the tool handle, and having a plurality of guiding holes provided equally on a cone coaxial of the chuck body; a plurality of grippers connected with the chuck body, mounted in the guiding holes of the chuck body, and having the rear end with partial thread and the front end used for clamping the tool handle; a driving member mounted around the chuck body and having inner thread for mating with the partial thread of the gripper; and a control outer sleeve, characterized in that further comprising: a center gear fixedly mounted to the chuck body; an inner gear ring mounted coaxially with the chuck body, connected with the control outer sleeve, and having inner gear teeth thereon; and at least one pinion mounted to the driving member through a pin shaft and engaging with the inner gear ring and the center gear, respectively.

2. The clamping structure for a handled tool according to claim 1, characterized in that the control outer sleeve is provided with at least one driving key having a projection thereon, and the inner gear ring is provided with at least one positioning recess, wherein the projection associates with the positioning recess.

3. The clamping structure for a handled tool according to claim 2, characterized in that the control outer sleeve is further provided with at least one control key, the inner gear ring is further provided with at least one anti-loose member accommodating space, and the clamping structure further comprises:

a ratchet gear fixedly mounted to the chuck body and provided with ratchets thereon;

at least one resilient anti-loose member mounted in at least one anti-loose member accommodating space and having pawl portion thereon, the control key controlling the resilient anti-loose member to engage or disengage the pawl portion with or from the ratchets of the ratchet gear.

4. The clamping structure for a handled tool according to claim 3, characterized in that the ratchet gear is further provided with a stop ring portion.

5. The clamping structure for a handled tool according to claim 3, characterized in that the resilient anti-loose member is provided with a pivot portion and capable of swinging about the pivot portion.

6. The clamping structure for a handled tool according to claim 5, characterized in that the inner gear ring is provided with a partial pivot hole and the pivot portion mounted in the partial pivot hole.

7. The clamping structure for a handled tool according to claim 6, characterized in that a center pin is provided in the pivot portion.

8. The clamping structure for a handled tool according to claim 5, characterized in that the resilient anti-loose member is provided with a support portion and a projection portion so that when the control key is pressing the projection portion, the resilient anti-loose member is deformed such that the pawl portion engages with the ratchets of the ratchet gear.

9. The clamping structure for a handled tool according to claim 3, characterized in that the ratchet gear is formed integrally with the chuck body.

10. The clamping structure for a handled tool according to claim 3, characterized in that the ratchet gear is formed integrally with the driving member.

11. The clamping structure for a handled tool according to claim 3, characterized in that the chuck body is formed integrally with the center gear.

12. The clamping structure for a handled tool according to claim 3, characterized in that a retaining ring is provided between the resilient anti-loose member and the pinion.

13. The clamping structure for a handled tool according to claim 2, characterized in that the inner gear ring is further provided with at least one moving space for driving key, at least one driving key of the control outer sleeve being movable in the moving space for driving key.

14. The clamping structure for a handled tool according to claim 1, characterized in that the control outer sleeve is a combination consisting of a outer sleeve and a control ring connected together, wherein the outer sleeve is a sleeve-shaped member provided with a connecting serration circumferentially distributed, and the control ring is provided with connect serration arranged on the outer circumference for fixedly connecting with the outer sleeve.

15. The clamping structure for a handled tool according to claim 14, characterized in that the outer sleeve has striae convenient of griping, and the control ring has control keys.

16. The clamping structure for a handled tool according to claim 14, characterized in that the control outer sleeve is provided with at least one driving key having a projection thereon, and the inner gear ring is provided with at least one positioning recess, wherein the projection associates with the positioning recess.

17. The clamping structure for a handled tool according to claim 1, characterized in that the chuck body is provided with connect serration, and the center gear is fixedly mounted to the connect serration of the chuck body.

18. The clamping structure for a handled tool according to claim 1, characterized in that the chuck body is mounted with axial positioning ring thereon for positioning the driving member on the chuck body axially.

19. The clamping structure for a handled tool according to claim 1, characterized in that the driving member has a force-transferring end face at an acute angle with the normal surface of the axis of the driving member.

20. The clamping structure for a handled tool according to claim 1, characterized in that a bearing is provided between a support stand of the chuck body and the force-transferring end face of the driving member, the bearing has a retainer and a plurality of rolling bodies mounted in the retainer and arranged in a circle.

21. The clamping structure for a handled tool according to claim 20, characterized in that the bearing is a half-retainer bearing in which the retainer is an opening hollow truncated cone of which the generatrix line has a tilt angle with the plane of the rolling bodies equal to that of the support stand of the chuck body, and the inscribed circle radius of the rolling bodies in radial direction is larger than the inner radius of the retainer.

22. The clamping structure for a handled tool according to claim 1, characterized in that the driving member is a rotatable composite structure.

23. The clamping structure for a handled tool according to claim 22, characterized in that the driving member comprises a nut and a driving sleeve, the nut having taper thread, a force-transferring end face and connect serration distributed on the external cylindrical surface, the driving sleeve fixedly mounted around the connect serration of the nut.

24. The clamping structure for a handled tool according to claim 23, characterized in that the pin shafts are parallel to the axis of the driving sleeve and fixedly mounted to an end face of the driving sleeve in the same circle centering at the axis.

25. The clamping structure for a handled tool according to claim 1, characterized in that the outer sleeve has striae convenient of gripping.

26. The clamping structure for a handled tool according to claim 1, characterized in that further comprising rear cap that is mounted at the tail portion of the chuck body and has a hole connecting to the tail portion of the chuck body and a plurality of connect keys.

27. The clamping structure for a handled tool according to claim 1, characterized in that a front cover is mounted at the front portion of the chuck body and provided with an annular connecting groove.

28. The clamping structure for a handled tool according to claim 27, characterized in that the a clip ring is mounted at the front portion of the chuck body and positions the inner gear ring and the front cover at the chuck body axially.

29. The clamping structure for a handled tool according to claim 1, characterized in that the rear cap can be set in the annular connecting groove of the outer sleeve.

30. The clamping structure for a handled tool according to claim 1, characterized in that the chuck body has counter bore in the accommodating space, the length of the counter bore being larger than that of the head of the screw that connects the chuck body to the driving spindle.

31. The clamping structure for a handled tool according to claim 1, characterized in that the chuck body has at least one connecting groove at its rear portion, an annular groove at its front portion, and a screw hole or a cone hole connecting to the driving spindle at its rear end.

32. The clamping structure for a handled tool according to claim 1, characterized in that at least one antifriction unit is provided between the chuck body and the control outer sleeve and/or between the driving member and the control outer sleeve.

33. The clamping structure for a handled tool according to claim 32, characterized in that the antifriction unit is made of PTFE or graphite.

34. The clamping structure for a handled tool according to claim 32, characterized in that the antifriction unit comprises the rolling bodies and the retainer.

* * * * *

UNITED STATES PATENT AND TRADEMARK OFFICE
CERTIFICATE OF CORRECTION

PATENT NO. : 7,581,907 B2
APPLICATION NO. : 11/441631
DATED : September 1, 2009
INVENTOR(S) : Zhou et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 580 days.

Signed and Sealed this

Fourteenth Day of September, 2010

David J. Kappos
*Director of the United States Patent and Trademark Office*